United States Patent
Yoo et al.

(10) Patent No.: US 11,777,130 B2
(45) Date of Patent: Oct. 3, 2023

(54) APPARATUS AND METHOD FOR STACKING ELECTRODE ASSEMBLY

(71) Applicant: LG Energy Solution, Ltd., Seoul (KR)

(72) Inventors: Jae Woong Yoo, Daejeon (KR); Seong Je Jo, Daejeon (KR)

(73) Assignee: LG Energy Solution, Ltd.

( * ) Notice: Subject to any disclaimer, the term of this patent is extended or adjusted under 35 U.S.C. 154(b) by 0 days.

(21) Appl. No.: 17/537,755

(22) Filed: Nov. 30, 2021

(65) Prior Publication Data

US 2022/0181672 A1 Jun. 9, 2022

(30) Foreign Application Priority Data

Dec. 4, 2020 (KR) ........................ 10-2020-0168813

(51) Int. Cl.
*H01M 10/04* (2006.01)
(52) U.S. Cl.
CPC .............................. *H01M 10/0404* (2013.01)
(58) Field of Classification Search
CPC ............... H01M 10/04–0409; B65G 57/00–28
See application file for complete search history.

(56) References Cited

U.S. PATENT DOCUMENTS

2021/0265650 A1* 8/2021 Kim .................. H01M 10/0463

FOREIGN PATENT DOCUMENTS

| JP | H0958995 | A | 3/1997 | |
|---|---|---|---|---|
| JP | 5666805 | B2 | 2/2015 | |
| KR | 20030071916 | A | 9/2003 | |
| KR | 200343382 | Y1 | 3/2004 | |
| KR | 20130021942 | A | 3/2013 | |
| KR | 20160107570 | A | 9/2016 | |
| KR | 101806236 | B1 | 12/2017 | |
| KR | 102120403 | B1 * | 6/2020 | ........ H01M 10/0463 |
| KR | 20200069883 | A | 6/2020 | |
| KR | 20200104190 | A | 9/2020 | |

* cited by examiner

*Primary Examiner* — Jonathan Crepeau
*Assistant Examiner* — Jacob Buchanan
(74) *Attorney, Agent, or Firm* — Lerner David LLP

(57) ABSTRACT

An apparatus for stacking electrode assemblies includes: a magazine, a loading plate, a lifting member, a receiver, and an auxiliary lifting mechanism. The magazine has a magazine frame defines a storage space within which electrode assemblies can be stacked and stored. The loading plate is configured to support the electrode assemblies and has a through hole. The lifting member is positioned in the magazine frame and is coupled to the loading plate so as to vertically displace the loading plate within the magazine frame. The receiver is positioned above the magazine frame and is movable between a loading position (to temporarily support the electrode assemblies) and a retracted position (to transfer the electrode assemblies to the loading plate). The auxiliary lifting mechanism is coupled to the loading plate and includes an auxiliary lift configured to advance through the through hole of the loading plate.

15 Claims, 4 Drawing Sheets

【FIG. 1】
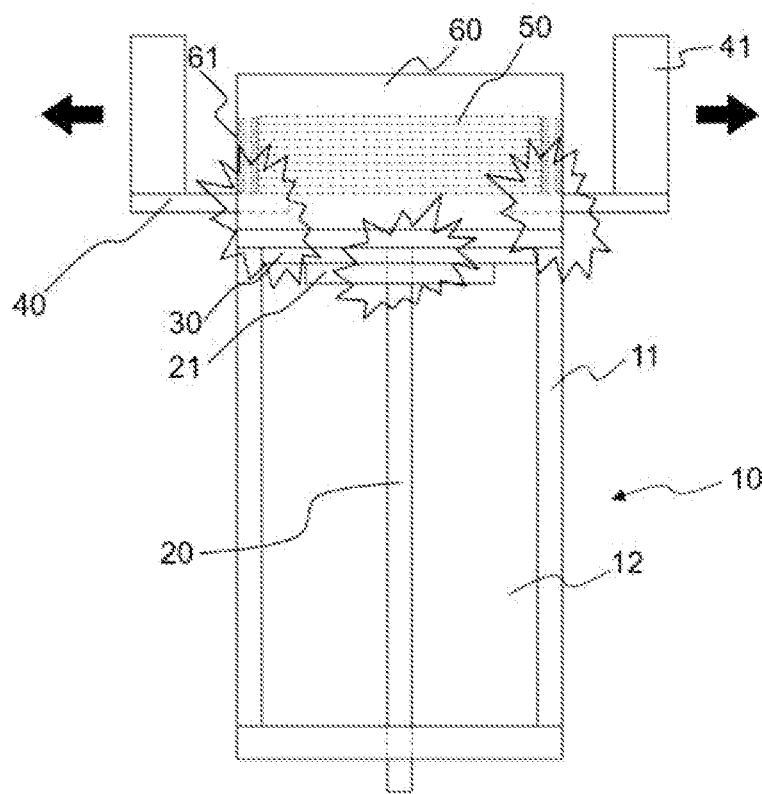
【FIG. 2】
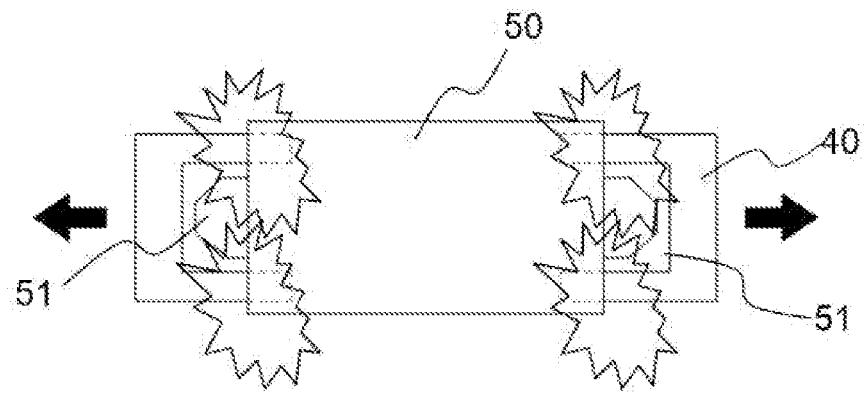

[FIG. 3]
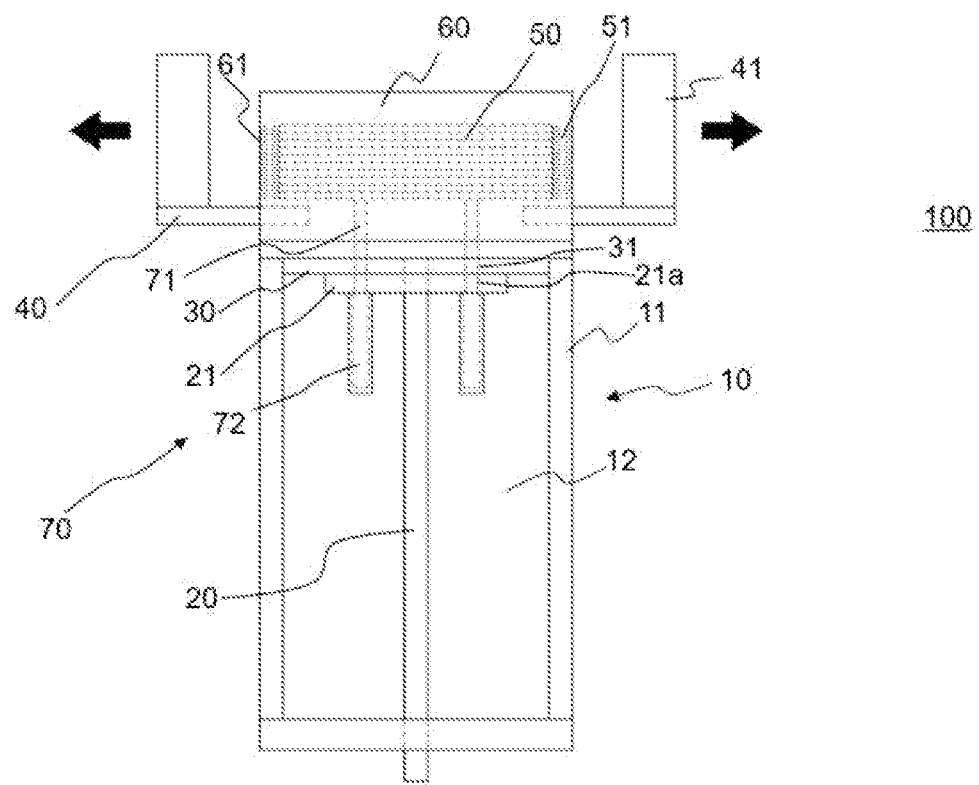

[FIG. 4(a)]
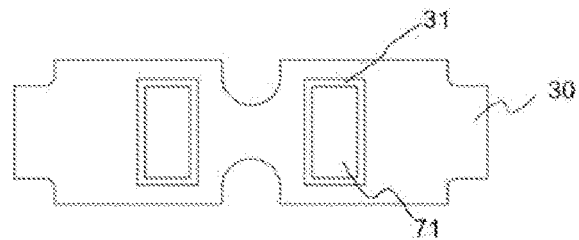
[FIG. 4(b)]
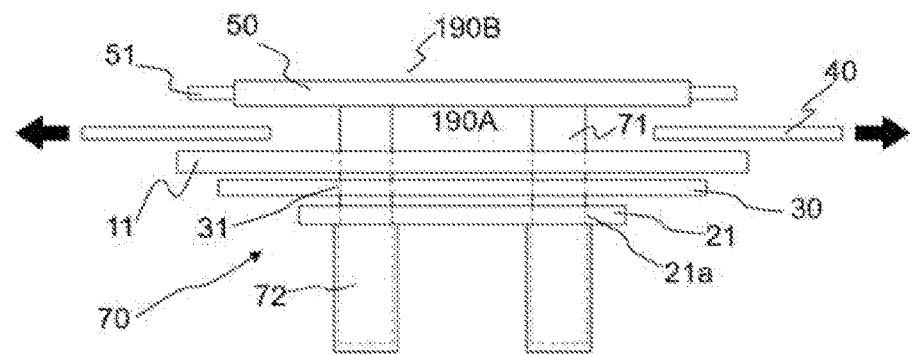
[FIG. 5]
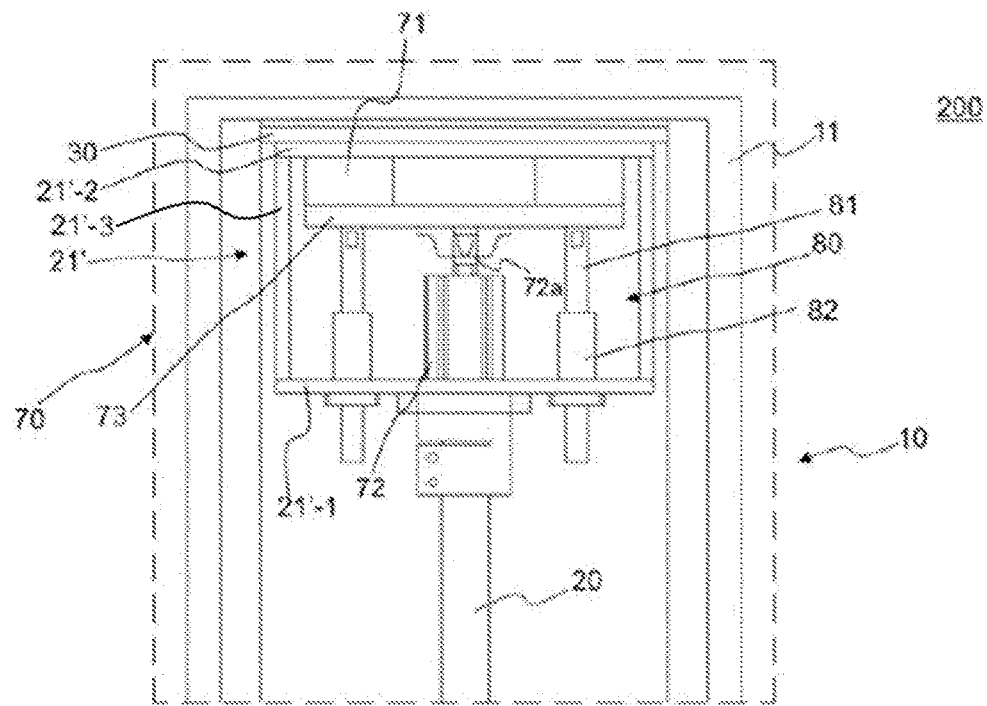

[FIG. 6]
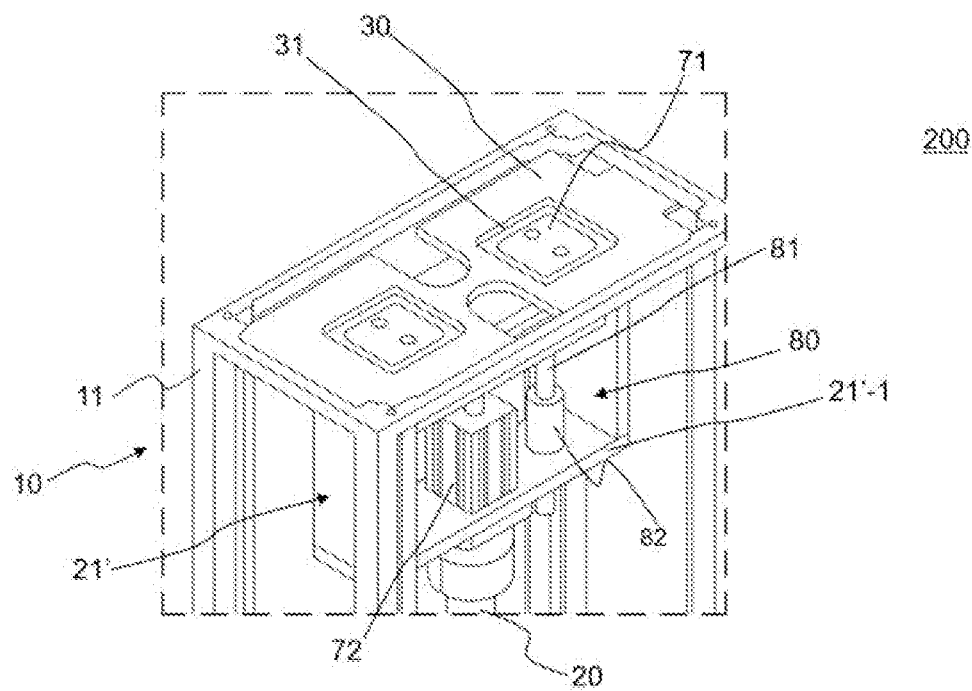

APPARATUS AND METHOD FOR STACKING ELECTRODE ASSEMBLY

CROSS-REFERENCE TO RELATED APPLICATIONS

This application claims priority from Korean Patent Application No. 10-2020-0168813, filed on Dec. 4, 2020, and the entire contents of the Korean patent application are incorporated herein by reference.

TECHNICAL FIELD

The present invention relates to an apparatus and method for stacking an electrode assembly for a secondary battery. More specifically, the present invention relates to an apparatus and method for stacking an electrode assembly by preventing damage to the electrode assembly caused by a receiver (buffer) for temporarily loading the electrode assembly.

BACKGROUND TECHNOLOGY OF THE INVENTION

With the increase in technology development and demand for mobile devices, the demand for secondary batteries is also rapidly increasing. Among them, lithium secondary batteries are widely used as an energy source for various electronic products as well as various mobile devices because of their high energy density and high operating voltage and excellent storage and lifetime characteristics.

An electrode assembly for charging and discharging electric energy in a case is built in the lithium secondary battery. A separator is interposed between the positive electrode and the negative electrode of the electrode assembly. The electrode assembly may be assembled in the form of bi-cells in the form of positive electrode-separator-negative electrode-separator-positive electrode or negative electrode-separator-positive electrode-separator-negative electrode.

The electrode assembly is produced through a process of notching and cutting an electrode material. The cut electrode assembly is loaded and stored in a magazine. In order to store electrodes in a magazine, electrodes should be moved to the magazine. Namely, electrode assemblies are input from the upper portion of the magazine, and if the electrode assemblies are fully filled, the magazine should be replaced. Such a series of processes proceed continuously. When replacing the magazine, in order to temporarily load the electrode assembly, a receiver (buffer) is installed above the magazine.

FIG. 1 shows a conventional apparatus for stacking an electrode assembly.

As illustrated, when a magazine 10 filled with electrode assemblies 50 is replaced and a new magazine is inserted, a receiver 40 is installed to temporarily load the electrode assembly 50. An alignment hopper 60 is installed at the upper portion of the receiver 40, and electrode assemblies 50 are input from the upper portion of the alignment hopper 60. The upper and lower sides of the alignment hopper 60 are opened, and an opening part 61 is formed at a part of the side surface of the alignment hopper 60. The electrode assembly 50 has a main body and a tab part 51 located on the side of the main body, and the tab part 51 is positioned at the opening part 61 of the side surface of the alignment hopper. The receiver 40 enters the alignment hopper from the opening part 61 of the side surface of the alignment hopper by the receiver driving unit 41, and the electrode assemblies 50 are loaded on the receiver 40. The receiver 40 ascends along the opening part 61 of the side surface of the alignment hopper, and the electrode assemblies 50, which are sequentially input from the upper portion of the alignment hopper 60, are stacked and loaded on the receiver 40 one by one.

When a new magazine 10 is installed at the lower portion of the receiver 40, a lifting member 20, including a loading plate 30 at the tip portion of the lifting member 20, ascends in the magazine 10, so that the loading plate 30 ascends until it is positioned at a position right below the receiver 40. If the loading plate 30 is lifted to a preset position, the receiver 40 is moved to the external side of the alignment hopper by the receiver driving unit 41 (see the arrow of FIG. 1), and the electrode assemblies 50 loaded on the receiver 40 are placed on the loading plate 30. The loading plate 30, where the electrode assemblies 50 are placed, gradually descends in the magazine 10 by the lifting member 20, and the electrode assemblies 40, which are input from the upper alignment hopper 60, are continually loaded in the storage space 12 in the magazine frame until the magazine 10 is fully filled.

However, in the conventional stacking device, when the receiver 40 transfers the electrode assemblies 50 to the loading plate 30, the electrode assemblies 40 on the receiver are maintained in position while the receiver 40 moves to the external side of the alignment hopper 60. In this process, the side surface portions of the electrode assemblies 50 in contact with the receiver 40 are damaged by friction, or the electrode assemblies become misaligned. Since several electrode assemblies 50 are loaded in the receiver, the frictional force becomes large due to the weight of the electrode assemblies. As such, some of the electrode assemblies 50 may be torn or damaged. Further, when the electrode assemblies 50 are input into the magazine 10 in a misaligned state, the electrode assemblies can bump into the frame 11 of the magazine, which causes additional damage. The indications of collisions in FIG. 1 represent friction with the receiver 40 and collision with the magazine frame 11.

FIG. 2 better illustrates that the electrode assemblies 50 on the receiver are impacted by the movement of the receiver 40.

In order to avoid such a situation, a technology for further lifting a lifting member and a loading plate into the inside of the alignment hopper over the magazine frame was proposed, as in Korean Patent Publication No. 10-2020-0069883. In that case, since the loading plate, when lifted into the alignment hopper, may bump into the receiver, collision is prevented by forming a groove for inserting the receiver on the loading plate.

However, it is difficult to control the stroke of the lifting member when lifting it up over the magazine frame to the alignment hopper, as the lifting member has a stroke ascending and descending within the magazine frame, and there is also a risk that the loading plate will collide with the alignment hopper. Further, even when a groove is formed on the loading plate, if the receiver does not fit the groove, the receiver and the loading plate may become caught, which may cause a stop of the device operation. Further, the loading plate should be able to bear the load of several electrode assemblies. In such case, when several grooves are formed on the loading plate, it may weaken the rigidity of the loading plate.

Therefore, there is a need for a technology for preventing damage to electrode assemblies by the receiver while maintaining the stroke of the lifting member as designed.

DESCRIPTION OF THE INVENTION

Technical Problem

The present invention is believed to solve at least some of the above problems. For example, an aspect of the present invention provides an apparatus for stacking electrode assemblies while preventing damage to the electrode assemblies by a receiver. That aspect of the present invention accomplishes that by lifting the electrode assemblies above a loading plate of a lifting member while maintaining the lifting stroke of a lifting member.

Further, an aspect of the present invention may provide an apparatus for stacking an electrode assembly that accommodates electrode assemblies in a magazine by stably supporting the electrode assemblies with an auxiliary lift and a loading plate.

Further another aspect of the present invention is to provide a stacking method of an electrode assembly capable of solving a conventional problem.

Technical Solution

An apparatus for stacking a plurality of electrode assemblies of the present invention may include: a magazine, a loading plate, a lifting member, a receiver, and an auxiliary lifting mechanism. The magazine may have a magazine frame may define a storage space within which the electrode assemblies can be stacked and stored. The loading plate may be configured to support the electrode assemblies, and the loading plate may have at least one through hole. The lifting member may be positioned in the magazine frame and be coupled to the loading plate so as to vertically displace the loading plate within the magazine frame. The receiver may be positioned above the magazine frame, and the receiver may be configured to temporarily support the electrode assemblies delivered from above when in the loading position, and the receiver may be configured to transfer the electrode assemblies to the loading plate when in the retracted position. The auxiliary lifting mechanism may be coupled to the loading plate, and the auxiliary lifting mechanism may include at least one auxiliary lift configured to advance through the at least one through hole of the loading plate.

Specifically, in the stacking apparatus, the auxiliary lift may be configured to advance through the at least one through hole of the loading plate to lift electrode assemblies supported by the receiver so that the electrode assemblies are elevated above the receiver, such that the receiver can be moved to the retracted position.

As one example, the at least one through hole of the loading plate and the at least one auxiliary lift may comprise a plurality of through holes and a plurality of auxiliary lifts, respectively.

As one example, the loading plate may be coupled to a support frame installed at an upper end of the lifting member. Alternatively, the loading plate and the support frame may be integrally formed.

As a specific example, the auxiliary lifting mechanism may further include a driving unit for advancing the at least one auxiliary lift through the at least one hole of the loading plate, and the driving unit and the at least one auxiliary lift may be installed on the support frame. The support frame may include at least one through hole through which the at least one auxiliary lift is configured to advance.

In this embodiment, the through holes of the loading plate, the driving units, and the auxiliary lifts may be positioned with one of each on a left side of the apparatus and one of each on a right side of the apparatus, with the lifting member positioned therebetween, preferably centrally located between the left and right sides.

In another embodiment, the driving unit and the lifting member may be coaxial with one another.

The driving unit may be a lift cylinder.

As a specific example, a connecting plate may be coupled with an upper end of the lift cylinder, and the at least one auxiliary lift may be coupled to an upper surface of the connecting plate, with a first one of the auxiliary lifts being positioned on a right side of the connecting plate and a second one of the auxiliary lifts being positioned on a left side of the connecting plate.

As a preferable embodiment, an upper end of a guide cylinder may be coupled to a lower surface of the connecting plate, and a lower end of the guide cylinder may be coupled with the support frame.

As a more specific example, the support frame may include an upper frame portion and a lower frame portion spaced apart by at least one vertical strut, and the lift cylinder, the connecting plate, and the first and second auxiliary lifts may be positioned within the support frame between the upper and lower frame portions. Moreover, first and second through holes, through which the respective first and second auxiliary lifts are configured to advance, may be provided in the upper frame portion of the support frame.

The apparatus of the present invention may further include an alignment hopper positioned above the magazine and configured to accommodate the electrode assemblies therein. The alignment hopper may include a side opening through which the receiver moves.

A method for stacking a plurality of electrode assemblies is another aspect of the present invention. Such method may include: a step of sensing a state of a first magazine being filled; a step of advancing a receiver into an alignment hopper when it is sensed that the first magazine is filled; a step of inserting the electrode assemblies into the alignment hopper to form a stack of electrode assemblies on the receiver positioned in the alignment hopper; a step of inserting a second magazine under the receiver; a step of lifting a loading plate in the second magazine to a position proximate an upper end of the second magazine; a step of advancing an auxiliary lift upwardly through the loading plate and into the alignment hopper so as to thereby lift the stack of electrode assemblies above the receiver; a step of moving the receiver outwardly from the alignment hopper; a step of lowering the auxiliary lift to thereby allow the electrode assemblies to be disposed on the loading plate; and a step of lowering the loading plate to thereby allow the electrode assemblies to be accommodated in the second magazine.

Advantageous Effects

According to the present invention, since electrode assemblies may be lifted from the receiver by the auxiliary lift and be held, damage to the electrode assemblies by the receiver may be prevented.

Further, since the lifting member itself may maintain the lifting stroke ascended and descended in the magazine, it is possible to overcome the difficulty of control of additionally lifting the lifting member to the inside of the alignment hopper.

Further, in the present invention, the electrode assemblies may be stably supported by the auxiliary lift and the loading plate, to thereby be stacked and accommodated in the magazine.

BRIEF DESCRIPTION OF THE DRAWINGS

FIG. 1 shows a conventional apparatus for stacking an electrode assembly.

FIG. 2 is a schematic diagram illustrating a process of damage to an electrode assembly by a conventional receiver.

FIG. 3 is a lateral perspective view showing an apparatus for stacking an electrode assembly according to one embodiment of the present invention.

FIG. 4 is a FIGS. 4(a) and 4(b) are schematic diagrams illustrating a process of operation of a stacking apparatus according to the embodiment of FIG. 3.

FIG. 5 is a side view of an apparatus for stacking an electrode assembly according to another embodiment of the present invention.

FIG. 6 is a perspective view of the stacking apparatus of FIG. 5.

BEST MODE FOR CARRYING OUT THE INVENTION

Hereinafter, the detailed configuration of the present invention will be described in detail with reference to the accompanying drawings and various embodiments. Embodiments described below are exemplary to assist in understanding of the present invention, and in order to help understand the invention. The accompanying drawings are not shown to scale and the dimensions of some components may be exaggerated.

As the inventive concept allows for various changes and numerous embodiments, particular embodiments will be illustrated in the drawings and described in detail in the text. However, this is not intended to limit the present invention to the specific form disclosed, and it should be understood that the present invention encompasses all changes, equivalents, and substitutes within the spirit and scope of the present invention.

An apparatus for stacking an electrode assembly according to one aspect of the present invention includes: a magazine, a loading plate, a lifting member, a receiver, and an auxiliary lifting mechanism. The magazine may have a magazine frame defining a storage space for storing electrode assemblies in the magazine frame. The loading plate is configured to support the electrode assemblies, and the loading plate includes at least one through holes. The lifting member is positioned in the magazine frame and coupled to the loading plate so as to vertically displace the loading plate within the magazine frame. The receiver is positioned above the magazine frame, and the receiver is configured to temporarily support the electrode assemblies delivered from above when in the loading position, and the receiver is configured to transfer the electrode assemblies to the loading plate when in the retracted position. The auxiliary lifting mechanism is coupled to the loading plate, and the auxiliary lifting mechanism includes at least one auxiliary lift configured to advance through the at least one through hole of the loading plate.

The present invention is characterized in providing an auxiliary lifting means including an auxiliary lift in a lifting member. Namely, an auxiliary lifting means for additional lifting is installed as part of the lifting member, in addition to the conventional lifting member in the magazine frame.

The auxiliary lifting means includes an auxiliary lift, and this auxiliary lift can hold electrode assemblies loaded on the receiver out of the magazine frame. As such, the lifting member may maintain the lifting and descending stroke within the magazine frame as in the conventional art. The loading plate installed on the end of the lifting member includes through holes, through which the auxiliary lift may pass, and the auxiliary lift may ascend toward the receiver through the through holes. If the auxiliary lift lifts electrode assemblies loaded on the receiver and holds those electrode assemblies above the receiver, the receiver may then be moved outwardly. At that time, since there is no friction or contact between the receiver and the electrode assemblies, it is possible to prevent the damage to the electrode assemblies that can occur in the conventional art.

Hereinafter, a more specific embodiment of the present invention will be described with reference to the drawings and the like.

First Embodiment

FIG. 3 is a lateral perspective view showing an apparatus 50 for stacking an electrode assembly 50 according to one embodiment of the present invention. In the present embodiment, the same components as those of the conventional stacking apparatus are denoted by the same reference numerals.

FIG. 3 shows a state in which the auxiliary lift 71 has been lifted in order to hold electrode assemblies 50 temporarily received by a receiver 40 in an alignment hopper 60.

A magazine 10 including a magazine frame 11 is located under the alignment hopper 60 and the receiver 40 in order to accommodate electrode assemblies 50. The configurations of the alignment hopper 60 and the receiver 40 are the same as those of the existing devices of FIGS. 1 and 2, and a detailed description thereof is omitted here.

The magazine 10 includes a storage space 12 for stacking and storing electrode assemblies 50 in the magazine frame 11.

A loading plate 30 for receiving electrode assemblies is installed in the magazine 10. The loading plate 30 includes through holes 31, through which an auxiliary lift 71 to be described later may pass.

A lifting member 20 is installed in the magazine 10, and the lifting member 20 is vertically moved in the longitudinal direction of the magazine frame 11. The lifting member 20 is connected to a lift driving unit (not shown), and in the present embodiment, the lifting member 20 is configured in the form of a lifting axis. A loading plate 30 is installed at the end of the lifting member 20, and the loading plate 30 also ascends and descends based on the lifting movement of the lifting member 20. In order to receive electrode assemblies 50 loaded on the receiver 40, the lifting member 20 is set so that the loading plate 30 at its distal end may get close to the upper frame of the magazine frame 11.

In the present embodiment, the support frame 21 is installed at the end of the lifting member 20, and the loading plate 30 is installed at the upper portion of the support frame 21. However, the loading plate 30 and the support frame 21 may be integrally configured. Herein, in order to secure an installation space for installing the auxiliary lifting means 70 to be described later in the lifting member 20, the support frame 21 is preferably interposed.

Before the state of FIG. 3, the receiver 40 supports both sides of the electrode assemblies 50 installed in the alignment hopper 60 and temporarily receives the electrode assemblies 60. The receiver 40 moves upward along the alignment hopper 60 through the opening part 61 formed along the side of the alignment hopper 60, to thereby accommodate electrode assemblies 50 one by one. As the electrode assemblies 50 are stacked on the receiver 40, the receiver gradually descends to the lower end position of the alignment hopper 60. The receiver 40 includes a driving unit 41, to thereby be movable forward and backward above the magazine frame 11. As shown in FIG. 1, electrode assemblies 50 are accommodated while the receiver 40 is positioned inside of the alignment hopper 60, and then when delivering the electrode assemblies 50 to the loading plate 30, the receiver driving unit 41 moves the receiver 40 outward to the external side of the alignment hopper 60 as shown by arrows of FIGS. 1 and 3.

The auxiliary lifting means 70 of the present invention is installed on the lifting member 20. Specifically, the auxiliary lifting means 70 is coupled to the loading plate 30, and the auxiliary lifting means 70 may be coupled to the support frame 21 installed on the lifting member 20 in the present embodiment. The auxiliary lifting means 70 includes an auxiliary lift 71 and a lift driving unit 72 capable of lifting the auxiliary lift 71. The lift driving unit 72 may include a servo motor and a power transmission member for converting a rotary motion into a straight line motion. Alternatively, the lift driving unit 72 may include a cylinder and a power transmission member for transferring the straight line motion of the cylinder to the moving unit. However, there is no special limitation in the driving unit if the driving unit can appropriately move the auxiliary lift 71 upward and downward. In the present embodiment, the lift cylinder 72, which is a pneumatic or hydraulic cylinder, is employed as a driving unit. When the cylinder is moved up and down by pneumatic or hydraulic pressure, the auxiliary lift 71 connected thereto may be moved up and down. The auxiliary lift 71 and the driving unit 72 may be coupled with the support frame 21. In this case, the support frame 21 may form a fastening hole for installing an auxiliary lifting means 70 (auxiliary lift and driving unit). The auxiliary lift means 70 can be coupled with the fastening hole by a coupling member such as a bolt. If a support frame 21 is positioned within the lifting stroke region of the auxiliary lift 71, the corresponding portion of the support frame 21 may be formed with through holes 21a, through which the auxiliary lift 71 may pass. The through holes 21a should face the through holes 31 formed on the loading plate 30 at the upper portion of the support frame 21 so as to be vertically aligned with each other.

A plurality of through holes 31 of the loading plate 30 and a plurality of auxiliary lifts 71, which pass through the through holes 31, may be installed. In order to stably lift the electrode assembly 50, the auxiliary lifts 71 are preferably equipped one at the left and one at the right while having the lifting member 20 (lifting axis) at the center. In the present embodiment, a pair of auxiliary lifts 71 are provided at right and left sides. As such, a pair of driving units 72 of the auxiliary lift are installed. Herein, a pair of through holes 21a of the support frame 21, which is the path through which the auxiliary lift 71 is moved, are positioned at right and left sides.

FIGS. 4(a) and 4(b) are schematic diagrams illustrating a process of operation of a stacking apparatus according to the embodiment of FIG. 3. FIG. 4(a) is a plan view of a loading plate 30, and FIG. 4(b) is a side view showing a state in which an auxiliary lift 71 has been lifted.

As shown in FIGS. 4(a)-(b), in a state in which the loading plate 30 of the lifting member 20 becomes close to a position right below the upper frame of the magazine frame 11, the driving unit of the auxiliary lifting means 70 is additionally driven to thereby lift the auxiliary lift 71 to a position above the upper frame. Since through holes 21a and 31 are formed on the support frame 21 and the loading plate 30, the auxiliary lift 71 may be smoothly lifted toward the receiver 40 in the alignment hopper 60. The moving stroke of the auxiliary lift 71 is set to be greater than the distance between the loading plate 30 and the receiver 40. Hence, the auxiliary lift 71 may enter into the alignment hopper 60 above the magazine.

When electrode assembles 50 held in the receiver 40 are lifted by the lifting of the auxiliary lift 71, the receiver 40 will be in a state in which there is no load applied to it by the electrode assemblies 50, and thus the receiver 40 may smoothly move out of the alignment hopper 60 by the receiver driving unit 41. At this time, since the electrode assemblies 50 are in a state in which they have been lifted by the auxiliary lift and do not contact the receiver 40, the electrode assemblies 50 are not damaged by the movement of the receiver as in the conventional art. Furthermore, since there is no impact by the receiver 40, the alignment of the electrode assemblies 50 is maintained.

In a state in which the receiver 40 has been moved outward, if the auxiliary lift 71 descends and enters into the magazine frame 11, the electrode assemblies 50 at the upper portion of the auxiliary lift 71 are placed on the loading plate 30 shown in FIG. 4(a). The area of the rear surface of the electrode assemblies mounted on the auxiliary lift 71 will naturally be seated on the loading plate 30.

After the electrode assemblies 50 are placed on the loading plate 30, the auxiliary lift 71 further descends to an initial position (a position close to the bottom surface of the loading plate). Alternatively, the auxiliary lift 71 may descend to a position where the upper surface of the auxiliary lift and the upper surface of the loading plate are flush, so that the upper surface of the auxiliary lift 71 and the upper surface of the loading plate 30 may support the electrode assembly 50 together. In order to better support the electrode assemblies 50, it may be preferable to have the auxiliary lift 71 move to the latter, flush position.

If the auxiliary lift 71 and the loading plate 30 are disposed at a position adjacent to the upper frame of the magazine frame 11, and a certain number of electrode assemblies 50 are loaded on the upper portion of the loading plate 30, the electrode assemblies 50 continually descend from the alignment hopper 60 and are loaded on the electrode assemblies 50 on the loading plate 30. As electrode assemblies are stacked, the lifting member 20 gradually descends along the magazine frame 11, and the electrode assemblies 50 are stacked and loaded in the storage space 12 in the magazine. During this process, the receiver 40 is maintained outside of the alignment hopper 60 and does not prevent the electrode assemblies 50 from being stacked in the magazine frame 11.

Second Embodiment

FIG. 5 is a side view of a stacking apparatus 200 of electrode assemblies 50 according to second embodiment of the present invention, and FIG. 6 is a perspective view of the stacking apparatus 200 of FIG. 5.

The position and the number of driving units 72 of the auxiliary lifting means 70 of the second embodiment are different from those of the first embodiment. Further, in the second embodiment, a guide cylinder 80 for stably guiding the operation of the auxiliary lift 71 is additionally included in the auxiliary lifting means 70. Further, the shape of the support frame 21', to which the auxiliary lifting means 70 is mounted, is also different.

In the second embodiment, the driving unit 72 of the auxiliary lifting means 70 and the lifting member 20 are coaxially installed on the support frame 21'. As the driving unit 72 is installed coaxially with the lifting member 20, the load of the driving unit 72 is transferred to the lifting member 20, to thereby more stably support the driving unit 72 and the auxiliary lift 71. As such, the driving unit 72 for supporting a greater load may be installed on the lifting member 20 or the support frame 21'. Hence, in the present embodiment, only one driving unit 72 is installed. The auxiliary lifts 71 of the auxiliary lifting means 70 are coupled to each other through a connecting member (connecting plate 73). Namely, the auxiliary lifts 71 are installed on the right and left sides of the upper surface of the connecting plate 73, and the driving unit 72 is coupled to the bottom surface of the connecting plate 73. In the present embodiment, the driving unit 72 is a lift cylinder, and the tip portion of the lift cylinder is coupled at the other surface of the connecting plate 73. If the cylinder axis 72a of the lift cylinder 72 pushes up the connecting plate 73, the auxiliary lifts 71 on the connecting plate 73 are moved upward. The connecting plate 73 may be moved upward until contacting or getting close to the upper loading plate 30. As the connecting plate 73 supports the right and left auxiliary lifts 71, the power of the driving unit 72 may be stably transferred to the auxiliary lifts 71, to thereby stably perform lifting operation of the auxiliary lifts 71.

Meanwhile, a top end of a guide cylinder 80 may be coupled to the bottom surface of the connecting plate 73, underneath the positions where the auxiliary lifts 71 have been installed. The bottom end of the guide cylinder 80 may be coupled with the support frame 21' like the driving unit of the lift cylinder 72. The cylinder axis of the guide cylinder 80 supports and guides the vertical movement of the connecting plate 73 when the lift cylinder 72 is operated. Namely, the guide cylinder 80 assists and guides the ascending operation of the lift cylinder 72. Since the guide cylinder (axis) is coupled with the bottom side of the connecting plate 73 under the locations where the auxiliary lifts 71 are positioned, the guide cylinder 80 indirectly supports the load of the auxiliary lifts 71. As such, the auxiliary lifts 71 may be stably moved upward and downward with only one driving unit 72.

In the present embodiment, the form of the support frame 21' for supporting the loading plate 30 and the auxiliary lifting means 70 are different from that of the first embodiment. Since the support frame 21' is formed in the form of a rectangular frame form in the present embodiment, the lift cylinder 72, the connecting plate 73 and the auxiliary lifts 71 are accommodated and installed in the rectangular frame. As such, the support frame 21' may stably maintain the auxiliary lifting means 70. Herein, through holes, through which the auxiliary lift may pass, are formed in the upper frame 21'-2 of the support frame 21'. The through holes are formed at a position that is aligned in a straight line with through holes of the loading plate 30 positioned above. Further, the lift cylinder 72 and the guide cylinders 80 are coupled to the lower frame 21'-1 of the support frame, to thereby support the cylinder members. The upper frame 21'-2 and the lower frame 21'-1 of the support frame 21' are spaced apart by at least one vertical strut 21'-3.

FIGS. 5 and 6 do not illustrate the alignment hopper 60 and the receiver 40 of the above the magazine frame 10. Further, they show a state before the auxiliary lift 71 is lifted.

In the present embodiment, if the lift cylinder 72 installed coaxially with the lifting member 20 is operated to allow the cylinder axis 72a to be lifted, the connecting plate 73 is lifted and the auxiliary lifts 71 installed on the connecting plate 73 pass through the upper frame 21'-2 and the loading plate 30, to thereby move past the receiver 40 and into the alignment hopper 60. At this time, guide cylinders 80 located on the right and left sides of the lift cylinder 72 guide vertical movements of the lift cylinder shaft 72a and the auxiliary lifts.

By including the auxiliary lifting means 70 in the lifting member 20, the replacement of the magazine 10 and the stacking of the electrode assemblies 50 may also be smoothly performed.

Namely, according to the stacking method of the electrode assemblies of the present invention, it is sensed by a sensor (not shown) that the electrode assemblies 50 are fully stacked on the magazine 10.

When it is sensed that the magazine 10 is fully filled, the electrode assemblies 50 are loaded on the receiver 40 in the alignment hopper 60 until the magazine is replaced by a new magazine. Since the stacking of the magazine is one of the above described consecutive manufacturing processes, even if the magazine is replaced, the positioning of additional electrode assemblies 50 from the upper portion should not be stopped. Hence, when it is sensed that the magazine 10 is fully filled, the receiver 40 is made to be moved forward into the alignment hopper 60 in order to receive the electrode assemblies 50. Namely, the receiver 40 serves as a kind of buffer.

If the receiver 40 is moved into the alignment hopper 60 by the receiver driving unit 41 and is lifted in the alignment hopper 60, the electrode assemblies 50 are input from the upper portion of the alignment hopper 60 and are held by the receiver 40 in the alignment hopper 60. The receiver gradually descends in the alignment hopper based on the input of the electrode assemblies and continually stacks and holds the electrode assemblies.

A new magazine 10 is installed on the lower portion during the process of loading the electrode assemblies of the receiver.

When a new magazine is installed, the lifting member 20 lifts the loading plate 30 to a position close to the upper frame of the magazine.

If the loading plate 30 is lifted to a position close to the upper frame of the magazine and the receiver 40 of the upper portion, the auxiliary lifts 71 of the auxiliary lifting means 70 are lifted into an inside of the alignment hopper 60 by passing through the loading plate 30, to thereby allow the auxiliary lifts 71 to lift and hold the electrode assemblies 50 held in the receiver.

Thereafter, the receiver 40 is moved out of the alignment hopper.

Thereafter, the electrode assemblies 50 are placed on the loading plate by making the auxiliary lifts 71 descend through the loading plate 30.

Thereafter, by having the loading plate 30 descend, the electrode assemblies 50 are continually stacked in the magazine 10.

As described above, according to the present invention, by providing an auxiliary lift and an auxiliary lifting means for holding electrode assemblies from a receiver, it is possible to prevent damage to electrode assemblies by the receiver and maintain the aligned state without changing the stroke of the lifting member.

The form of the above auxiliary lift and the auxiliary lifting means may be configured differently from the above-described drawings to the extent that the technical ideas of this invention are satisfied. Accordingly, the embodiments described in the specification and the configurations described in the drawings are only the most preferred embodiments of the present invention, and they do not represent all of the technical ideas of the present invention. It is to be understood that there may be various equivalents and variations in place of them at the time of filing the present application.

DESCRIPTION OF REFERENCE NUMERALS

10: magazine
11: magazine frame
12: storage space
21: support frame
21a: through hole
21': support frame (rectangular frame)
21'-1: lower frame
21'-2: upper frame
30: loading plate
31: through hole
40: receiver
41: receiver driving unit
50: electrode assembly
51: electrode tab
60: alignment hopper
61: opening part
70: auxiliary lifting means
71: auxiliary lift
72: driving unit (lift cylinder)
73: connecting plate
80: guide cylinder
81: cylinder axis
82: guide portion
100, 200: stacking apparatus

The invention claimed is:

1. An apparatus for stacking a plurality of electrode assemblies, the apparatus comprising:
a magazine having a magazine frame defining a storage space within which the electrode assemblies can be stacked and stored;
a loading plate configured to support the electrode assemblies, the loading plate having at least one through hole;
a lifting member positioned in the magazine frame and coupled to the loading plate so as to vertically displace the loading plate within the magazine frame;
a receiver positioned above the magazine frame and movable between a loading position and a retracted position, the receiver configured to temporarily support the electrode assemblies delivered from above when in the loading position, and the receiver configured to transfer the electrode assemblies to the loading plate when in the retracted position; and
an auxiliary lifting mechanism coupled to the loading plate, the auxiliary lifting mechanism including at least one auxiliary lift configured to advance through the at least one through hole of the loading plate so as to lift the electrode assemblies relative to the loading plate.

2. The apparatus of claim 1, wherein the auxiliary lift is configured to advance through the at least one through hole of the loading plate to lift the electrode assemblies supported by the receiver so that the electrode assemblies are elevated above the receiver, such that the receiver can be moved to the retracted position.

3. The apparatus of claim 1, wherein the at least one through hole of the loading plate comprises a plurality of through holes, and wherein the at least one auxiliary lift comprises a plurality of auxiliary lifts.

4. The apparatus of claim 1, wherein the loading plate is coupled to a support frame installed at an upper end of the lifting member.

5. The apparatus of claim 4, wherein the loading plate and the support frame are integrally formed.

6. The apparatus of claim 4, wherein the auxiliary lifting mechanism further includes a driving unit for advancing the at least one auxiliary lift through the at least one through hole of the loading plate, the driving unit and the at least one auxiliary lift being installed on the support frame.

7. The apparatus of claim 6, wherein the at least one through hole of the loading plate comprises a first though hole and a second through hole, wherein the driving unit comprises a first driving unit and a second driving unit, and wherein the at least one auxiliary lift comprises a first auxiliary lift and a second auxiliary lift; the first through hole, the first driving unit, and the first auxiliary lift being positioned on a first side of the apparatus; the second through hole, the second driving unit, and the second auxiliary lift being positioned on a second side of the apparatus; and the lifting member being positioned between the first and second sides of the apparatus.

8. The apparatus of claim 6, wherein the driving unit and the lifting member are coaxial with one another.

9. The apparatus of claim 8, wherein the driving unit is a lift cylinder.

10. The apparatus of claim 9, wherein a connecting plate is coupled with an upper end of the lift cylinder, and wherein the at least one auxiliary lift is coupled to an upper surface of the connecting plate, the at least one auxiliary lift comprising a first auxiliary lift and a second auxiliary lift, the first auxiliary lift being positioned on a right side of the connecting plate and the second auxiliary lift being positioned on a left side of the connecting plate.

11. The apparatus of claim 10, wherein an upper end of a guide cylinder is coupled to a lower surface of the connecting plate, and a lower end of the guide cylinder is coupled with the support frame.

12. The apparatus of claim 11, wherein the support frame includes an upper frame portion and a lower frame portion spaced apart by at least one vertical strut; and wherein the lift cylinder, the connecting plate, and the first and second auxiliary lifts are positioned within the support frame between the upper and lower frame portions.

13. The apparatus of claim 12, wherein the lift cylinder and the guide cylinder are coupled with the lower frame portion of the support frame.

14. The apparatus of claim 1, further comprising an alignment hopper positioned above the magazine and configured to accommodate the electrode assemblies therein, wherein the alignment hopper includes a side opening through which the receiver moves.

15. A method for stacking a plurality of electrode assemblies, the method comprising:
a step of sensing a state of a first magazine being filled;
a step of advancing a receiver into an alignment hopper when it is sensed that the first magazine is filled;
a step of inserting the electrode assemblies into the alignment hopper to form a stack of electrode assemblies on the receiver positioned in the alignment hopper;
a step of inserting a second magazine under the receiver;
a step of lifting a loading plate in the second magazine to a position proximate an upper end of the second magazine;

a step of advancing an auxiliary lift upwardly through the loading plate and into the alignment hopper so as to thereby lift the stack of electrode assemblies above the receiver;

a step of moving the receiver outwardly from the alignment hopper;

a step of lowering the auxiliary lift to thereby allow the electrode assemblies to be disposed on the loading plate; and a step of lowering the loading plate to thereby allow the electrode assemblies to be accommodated in the second magazine.

* * * * *